United States Patent
Tsao et al.

(10) Patent No.: US 7,051,265 B2
(45) Date of Patent: May 23, 2006

(54) SYSTEMS AND METHODS OF ROUTING DATA TO FACILITATE ERROR CORRECTION

(75) Inventors: Jay Tsao, Plano, TX (US); Theodore Carter Briggs, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 371 days.

(21) Appl. No.: 10/632,206

(22) Filed: Jul. 29, 2003

(65) Prior Publication Data

US 2005/0028056 A1 Feb. 3, 2005

(51) Int. Cl.
*G11C 29/00* (2006.01)
*H03M 13/11* (2006.01)

(52) U.S. Cl. .................. 714/767; 714/772; 714/773
(58) Field of Classification Search .............. 714/767, 714/772, 773
See application file for complete search history.

(56) References Cited

U.S. PATENT DOCUMENTS

| | | | |
|---|---|---|---|
| 4,485,471 A | | 11/1984 | Singh et al. |
| 5,878,059 A | * | 3/1999 | Maclellan ................. 714/768 |
| 6,024,486 A | * | 2/2000 | Olarig et al. ............. 714/763 |
| 6,141,789 A | * | 10/2000 | Cypher ..................... 714/805 |
| 6,233,716 B1 | * | 5/2001 | Cypher ..................... 714/805 |
| 6,301,680 B1 | * | 10/2001 | Cypher ..................... 714/746 |
| 6,304,992 B1 | | 10/2001 | Cypher |
| 6,370,668 B1 | * | 4/2002 | Garrett et al. ............. 714/763 |
| 6,453,440 B1 | | 9/2002 | Cypher |
| 6,463,506 B1 | | 10/2002 | McAllister et al. |
| 6,473,880 B1 | * | 10/2002 | Cypher ..................... 714/800 |
| 6,477,682 B1 | | 11/2002 | Cypher |
| 6,493,843 B1 | * | 12/2002 | Raynham ................... 714/763 |
| 6,519,717 B1 | | 2/2003 | Williams et al. |
| 6,574,768 B1 | | 6/2003 | Cypher |
| 6,584,595 B1 | | 6/2003 | Cypher |
| 2002/0199150 A1 | * | 12/2002 | Holman ..................... 714/755 |
| 2003/0070133 A1 | * | 4/2003 | Baumen et al. ............ 714/763 |
| 2003/0140300 A1 | * | 7/2003 | Chen et al. ................ 714/763 |

OTHER PUBLICATIONS

Affidavit of Richard W. Adkisson, Feb. 17, 2005, 4 pages.
Timothy J. Dell, "A White Paper On The Benefits of Chipkill-Correct ECC for PC Server Main Memory", IBM Microelectronics Division, Nov. 19, 1997, pp. 1-23.

* cited by examiner

*Primary Examiner*—Stephen M. Baker

(57) ABSTRACT

Systems and methods are provided for detecting and correcting bit errors in data structures. A data block and/or data structure is partitioned into adjacent bit pair domains, such that a single adjacent bit pair from each memory device is assigned to a given adjacent bit pair domain. The adjacent bit pair domain data is transmitted over a bus having a plurality of data paths, such that data bits associated with a given memory device are transmitted over a same data path.

25 Claims, 6 Drawing Sheets

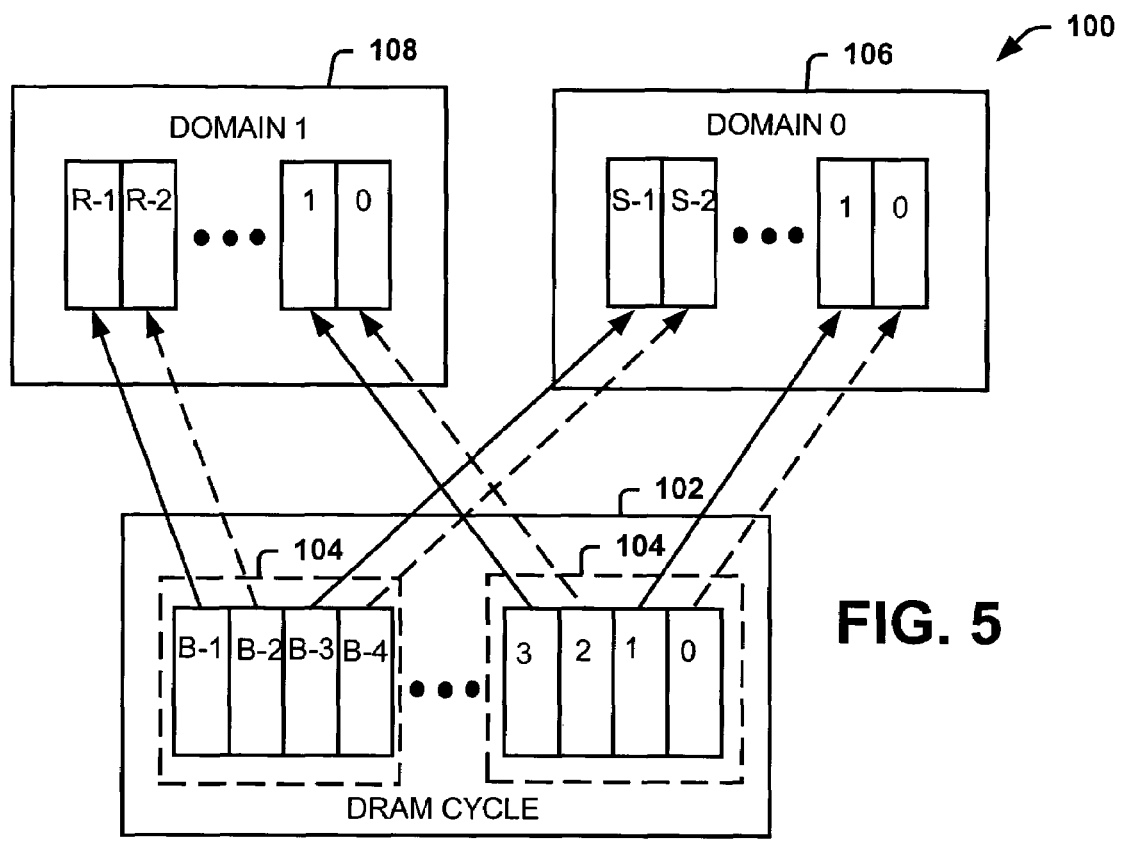
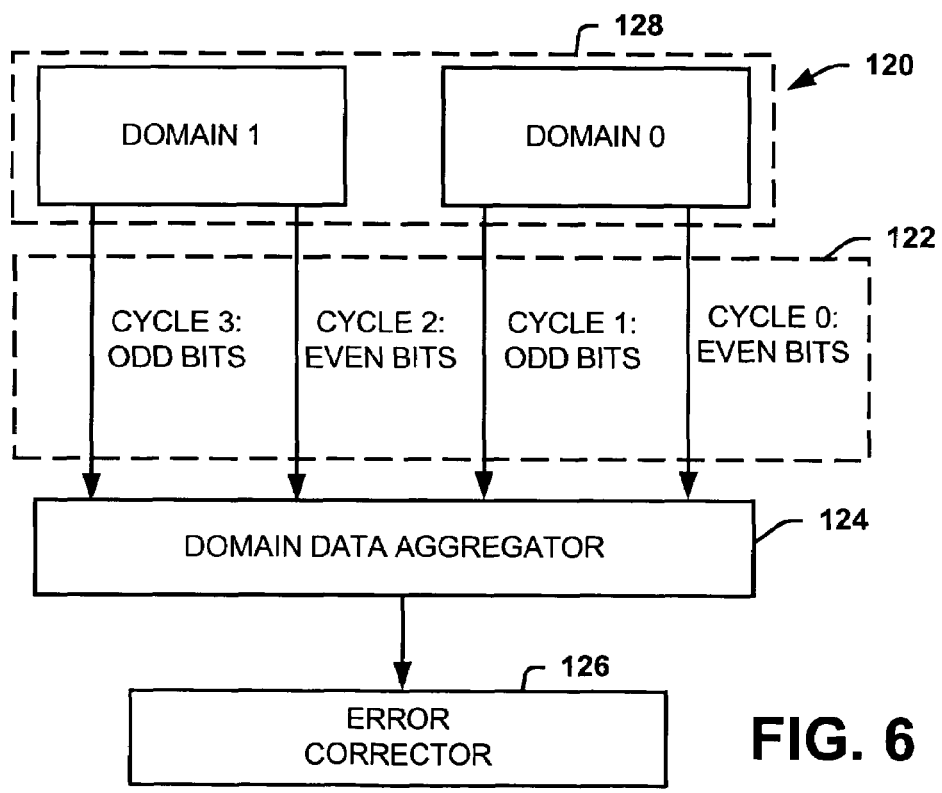

SYSTEMS AND METHODS OF ROUTING DATA TO FACILITATE ERROR CORRECTION

CROSS REFERENCE TO RELATED APPLICATIONS

The present application is related to Briggs, et al. U.S. patent application entitled "Systems and Methods of Partitioning Data to Facilitate Error Correction", Filed Jul. 29, 2003, Application Ser. No. 10/632,207, which is assigned to the same assignee as the present application and which is incorporated herein by reference.

TECHNICAL FIELD

The present invention relates to error correction and, more particularly, to the routing of data to facilitate error correction.

BACKGROUND OF INVENTION

Error control codes are commonly used in electronic systems to detect and/or correct data errors, such as transmission errors or storage errors. One common use of error control codes is to detect and correct errors with data stored in a memory of computer system. For example, error correction bits, also called check bits, can be generated for data prior to storing data to one or more memory devices. The check bits are appended to the data to provide a data structure that is stored in memory. When the data is read from the one or more memory devices, the check bits can be used to detect or correct errors within the data. Errors can be introduced, for example, either due to faulty components or noise in the computer system. Faulty components can include faulty memory devices or faulty data paths. Faulty data paths can include faulty pins, faulty data traces, or faulty wires.

Error management techniques have been developed to mitigate the effects associated with these errors. One simple technique used for personal computers is known as parity checking. Parity checking utilizes a single bit associated with a piece of data to determine whether there is a single bit error in the data. Parity checking cannot detect multiple bit errors and provides no means for correcting errors. A more sophisticated system, such as a server, uses error correction codes (ECCs) to detect and correct some errors. A typical ECC system may use eight ECC bits (check bits, correction bits) for a 64-bit piece of data. The ECC bits provide enough information for an ECC algorithm to detect and correct a single bit error, or to detect double bit errors.

One error correction feature employed by servers is referred to in the industry as chipkill. The term chipkill refers to the ability to correct multiple bit errors in memory, where multiple bit errors are confined with the width of the memory device. For example, for a 32 Mbit dynamic random access memory (DRAM) device that is 4 bits wide, a system that supports a chipkill function would be able to correct a 4-bit wide error in the memory device and/or data path from the memory device to an error corrector. Thus, the failure of an entire DRAM chip or data path during a DRAM cycle (e.g., read operation, write operation) organized into a 4-bit width configuration that supports chipkill would not cause the system to fail. Chipkill allows a system to operate in the event of multiple bit errors in any one memory device.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some general concepts of the invention in a simplified form as a prelude to the more detailed description that is presented later.

The present invention relates to systems and methods for routing data structure content to facilitate error correction. The systems and methods employ error correction code (ECC) techniques that detect and correct errors in a data structure. The data structure is partitioned into domains referred to herein as "adjacent bit pair domains," with each adjacent bit pair domain being assigned an adjacent bit pair from each memory device. Data associated with a given adjacent bit pair domain can include data bits and check bits that are employed by an ECC technique to detect and correct data bit errors (e.g., single bit errors, adjacent double bit errors) associated with the adjacent bit pair domain. The adjacent bit pairs in a respective adjacent bit pair domain are transmitted in two cycles, such that bits associated with a respective adjacent bit pair are transmitted over a same respective data path.

In one aspect of the invention, systems and methods are provided for routing data structure content to facilitate error correction. A data structure is partitioned into a plurality of adjacent bit pair domains, such that a single adjacent bit pair from each of a plurality of memory devices is assigned to an adjacent bit pair domain for each of the plurality of adjacent bit pair domains. A first set of bits associated with a respective adjacent bit pair domain is transmitted over a bus during a first transfer cycle, and a second set of bits associated with the respective adjacent bit pair domain is transmitted over a bus during a transfer second cycle. Both bits associated with each adjacent bit pair are transmitted over a same respective data path during the first and second transfer cycles. The first set of bits and the second set of bits are then aggregated to reconstruct the respective adjacent bit pair domain, which is then provided to an error detection and correction (EDC) component that detects and corrects errors associated with the reconstructed adjacent bit pair domain.

BRIEF DESCRIPTION OF THE DRAWINGS

FIG. 5 illustrates a block diagram of one particular implementation of an adjacent bit pair domain configuration in accordance with an embodiment of the present invention.

FIG. 6 illustrates a block diagram of one particular implementation of an adjacent bit pair domain transfer sequence in accordance with an embodiment of the present invention

DETAILED DESCRIPTION

The present invention relates generally to systems and methods for detecting and correcting bit errors in data structures resulting from faulty memory devices and faulty data paths. A data path can include a pin, a data trace, or wire that couples the memory devices to an error correction component. The systems and methods employ error correction code (ECC) techniques that detect and correct single bit errors and adjacent double bit errors in a data structure read from system memory and transmitted over a plurality of data paths to an error corrector.

The systems and methods are operative to process data structures having more bits than can be detected and corrected by a single application of the ECC techniques employed. This is accomplished by partitioning the data structure (data block) into domains having a number of bits equal to the number of bits that can be processed by a single application of the ECC technique. Chipkill for the memory system is facilitated by populating each domain with adjacent bit pairs such that each domain contains one respective adjacent bit pair from each memory device. Each domain is then provided to an error detection and correction component sequentially or to a plurality of error detection and correction components in parallel. Chipkill for the data paths is facilitated by transmitting bits from a respective memory device over the same data path (e.g., data wire, pins, traces), such that failure of any one data path does not cause a system memory failure.

Figure 1:
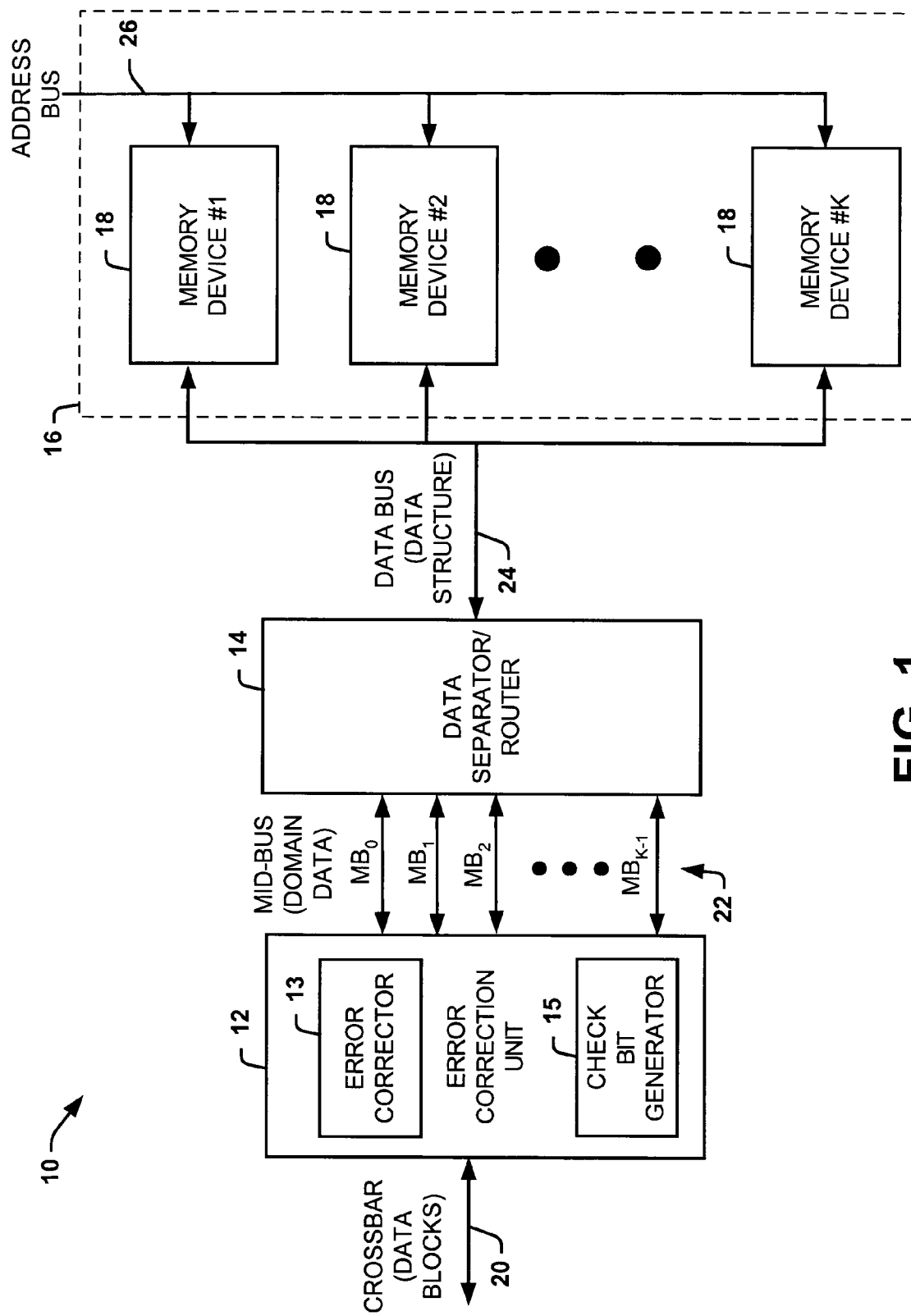
FIG. 1 illustrates a block diagram of a system for detecting and correcting bit errors in a data structure transmitted over a data path in accordance with an embodiment of the present invention.

FIG. 1 illustrates a system 10 for detecting and correcting errors in a data structure transmitted over one or more data paths in accordance with an aspect of the present invention. The system 10 can be a server or other computer system that performs error correction associated with a system memory. The system 10 includes an error correction unit 12, a data separator/router 14 and a system memory 16. The system memory 16 is comprised of a plurality of memory devices 18, labeled memory device #1 through #K, where #K is an integer greater than one. The memory devices 18 can be, for example but not limited to single-in-line memory modules (SIMM), dual-in-line memory modules (DIMM) and dynamic random access memory (DRAM) modules and other memory devices. The system memory 16 is coupled to a data bus 24 and an address bus 26. The size of the memory bus 24 and the data structure stored and read into memory in a single memory cycle is equal to the number of memory devices multiplied by the bit column width of the memory devices.

For example, if the system memory 16 is comprised of 72 memory devices having 4-bit column width, then the size of the data bus 24 and data structure stored and read in a single memory cycle would be 288 bits. However, an ECC checker and corrector for a 288-bit ECC codeword is considered impractical. Therefore, the present invention partitions the data structure into separate adjacent bit pair domains comprised of adjacent bit pairs from each memory device, such that a single adjacent bit pair from each of the memory devices is assigned to a given domain. Error detection and correction can then be performed on data bits associated with the separate adjacent bit pair domains sequentially in less time than otherwise required, or in parallel.

The error correction unit 12 is coupled to a crossbar device (not shown), for example, over a crossbar bus 20. The crossbar device can be coupled to a plurality of microprocessor devices, input/output devices and/or memory devices (e.g., one or more cache memory devices). The crossbar device is a switching/routing system that allows for communications between a plurality of different devices. The error correction unit 12 can be part of a memory controller or cache coherency controller. The functionality of the error correction unit 12 can be comprised of hardware, software or a combination of hardware and software. It is to be appreciated that the error correction unit 12 can be formed of at least a portion of an application specific integrated circuit or very large scale integrated (VLSI) circuit.

The error correction unit 12 includes an error corrector 13 and a check bit generator 15. The error correction unit 12 is operative to receive data blocks from the crossbar device, partition the data blocks into a plurality of adjacent bit pair domain data sets, and generate check bits for each of the plurality of adjacent bit pair domains. The check bits for the data block are then added to the adjacent bit pair domains. The adjacent bit pair domains are assigned to adjacent data bit pairs for each memory device, as discussed above. The number of adjacent bit pair domains is based on the column width of the memory devices 18. For example, two adjacent bit pair domains are employed for memory devices with a 4-bit column width, while four adjacent bit pair domains would be employed for memory devices with an 8-bit column width.

The adjacent bit pair domains are transmitted over a mid-bus 22 to the data separator/router 14 (e.g., buffer/multiplexer device). The data separator/router 14 can be a single integrated device or a plurality of devices that perform the functionality associated with the data separator/router 14. The adjacent bit pair domains are transmitted in a sequential order and buffered by the data separator/router 14. Once all of the data associated with the adjacent bit pair domains are received by the data separator/router 14, the data separator/router combines the adjacent bit pair domain data into a complete data structure. The complete data structure is transmitted over a data bus 24 to be stored in the system memory 16 based on the selected address of the address bus 26.

For example, during a read operation, a data structure associated with an address is read from the plurality of memory devices 18 and provided to the data separator/router 14 via the data bus 24. For example, if each memory device has a 4-bit column width, 4 bits from each memory device are provided to the data separator/router 14. If each memory device has an 8-bit column width, 8 bits from each memory device 18 are provided to the data separator/router 14. The data separator/router 14 partitions the data structure into adjacent bit pair domains. Each adjacent bit pair domain includes a data portion and a correction bit portion. The number of bits in an adjacent bit pair domain corresponds to the number of bits correctable within a desired amount of time by the error corrector 13 in the error correction unit 12.

Each adjacent bit pair domain is assigned adjacent bit pairs associated with the plurality of memory devices corresponding to a given address, such that a single adjacent bit pair from each memory device 18 is assigned to a given adjacent bit pair domain, and no more than one adjacent bit pair from a single memory device is assigned to a given domain. The data bits associated with a first adjacent bit pair domain are multiplexed via the data separator/router 14 and transmitted over the mid-bus 22 to be processed by the error corrector 13. The mid-bus includes a plurality of data paths labeled, $MB_0$–$MB_{K-1}$. Each data path is associated with a respective memory device 18, such that bits read from a given memory device are transmitted over the same data path.

The data bits in a respective separate adjacent bit pair domain are transmitted in two cycles, such that a first bit of a respective adjacent bit pair is transmitted in a first cycle and a second bit of a respective adjacent bit pair is transmitted in a second cycle over the same data path (e.g., wire). This is repeated for each adjacent bit pair domain as needed to cover the memory device width so that bits from the same memory device travel over the same data path. Therefore, chipkill is facilitated for both the data paths and the memory device concurrently without any additional overhead to the system.

While the data bits from the first adjacent bit pair domain are being processed by the error corrector 13, the data bits or portions of the data bits from the second adjacent bit pair domain are transmitted over the mid-bus 22 to the error corrector 13, such that a pipeline process is established. Subsequent data bits from additional domains, if applicable, are transmitted over the mid-bus 22 and processed by the error corrector 13, until all of the data bits associated with the data structure have been processed by the error corrector 13. Once all of the data bits have been checked and corrected for single bit errors and adjacent double bit errors, the check bits are discarded, the data associated with the adjacent bit pair domains are reorganized into a data block and transmitted to the crossbar device and routed to the initial requestor (e.g., a processor, I/O device).

It is to be appreciated that the error correction unit 12 can include additional correctors, such that correction of more than one ECC codeword can be performed in parallel on data bits associated with different domains to facilitate faster error correction. Additionally, the error correction unit 12 can include additional ECC codeword check bit generators, such that check bits can be assigned and appended to data bits associated with different domains to facilitate faster check bit generation.

Figure 2:
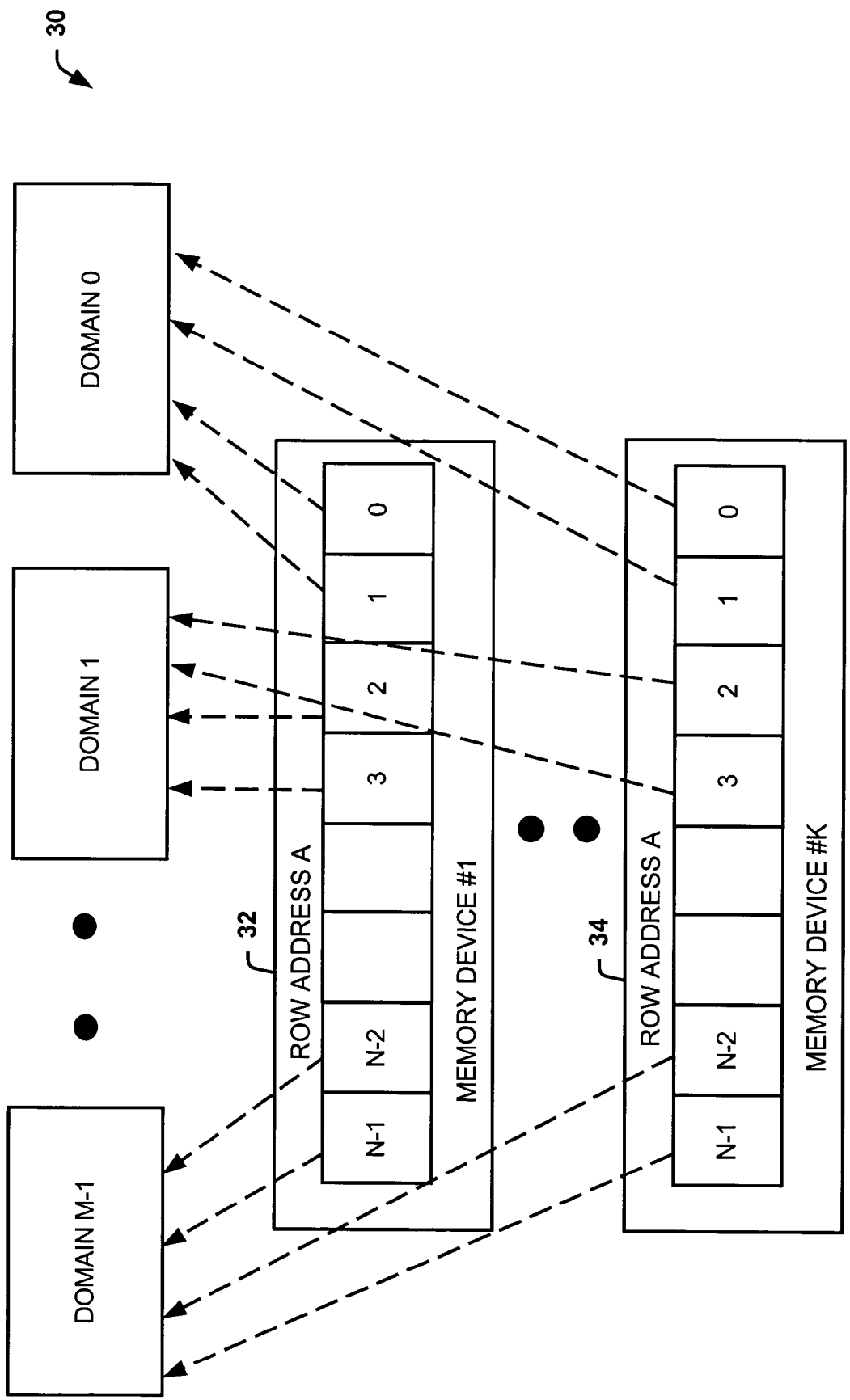
FIG. 2 illustrates a block diagram of an adjacent bit pair domain configuration in accordance with an embodiment of the present invention.

FIG. 2 illustrates an adjacent bit pair domain configuration 30 associated with the partitioning of a data structure in accordance with an aspect of the present invention. The adjacent bit pair domain configuration 30 facilitates chipkill functionality to system memory devices (e.g., for servers) associated with ECC techniques that can correct single and adjacent double bit errors with memory data buses larger than the capabilities of a single application of a simple ECC technique. The ECC techniques of the present invention can also detect double bit errors that are not adjacent. The domain configuration illustrates a plurality of memory devices 32, labeled memory device #1 through #K, where #K is an integer greater than one. Each of the memory devices 32 has a row associated with a given row address illustrated in FIG. 2 as row address A. During reading and writing of row address A, data bits associated with the row corresponding to row A are concurrently provided at the system memory data bus. Each row of the memory devices 32 has a column width N, where N is an integer multiple of 4 (e.g., 4, 8, 16, 32, etc.)

A first adjacent bit pair from each memory device 32, labeled bit #1 and bit #0, is assigned to adjacent bit pair Domain 0. A second adjacent bit pair from each memory device 32, labeled bit #3 and bit #2, is assigned to adjacent bit pair Domain 1. Subsequent adjacent bit pairs from each memory device 32 are assigned to subsequent adjacent bit pair domains, while the last set of bits labeled #N-1 and #N-2 from each memory device 42 are assigned to adjacent bit pair Domain M-1, where M is equal to N/2. FIG. 2 illustrates the interleaving of adjacent bit pairs to corresponding adjacent bit pair domains, such that one adjacent bit pair from each memory device 32 is assigned to a given domain during a memory read or write cycle. The above adjacent bit pair domain configuration can be scaled up or down depending on the number of bits in the adjacent bit pair domains, the bit column width of the memory devices in the system memory, and the number of bits that can be processed by the error correction technique being employed.

Figure 3:
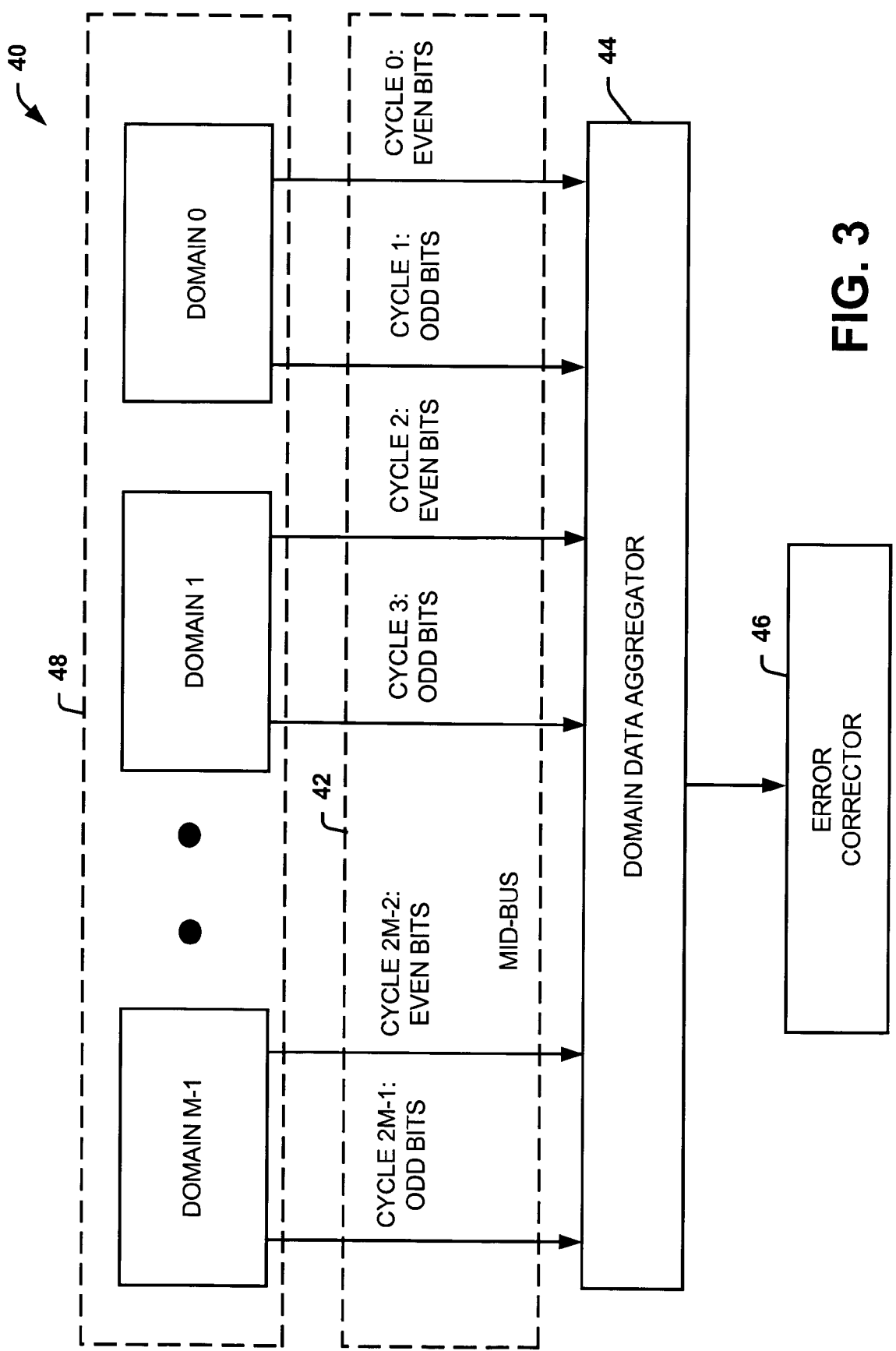
FIG. 3 illustrates a block diagram of an adjacent bit pair domain transfer sequence in accordance with an embodiment of the present invention.

FIG. 3 illustrates an adjacent bit pair domain transfer sequence 40 in accordance with an aspect of the present invention. A plurality of adjacent bit pair domains reside in a data separator/router 48. The plurality of adjacent bit pair domains are labeled domain 0 through domain M-1, where M is equal to the column width of the associated memory devices divided by two. The transfer sequence includes a plurality of two-cycle transfers for each adjacent bit pair domain. That is, a first bit of each adjacent bit pair from a respective domain are transferred over a mid-bus 42 via a respective data path during a first transfer cycle to a domain data aggregator 44. A second bit of each adjacent bit pair from the same respective domain is transferred over the mid-bus 42 via the same respective data path of the adjacent bit pair first bit during a second transfer cycle to the domain data aggregator 44.

The domain data aggregator 44 then aggregates or combines the first and second bits of each adjacent pair to reconstruct the adjacent bit pair domain. The adjacent bit pair domain is then provided to an error corrector 46 for error detection and correction of single bit errors and adjacent double bit errors. This is repeated for each adjacent bit pair domain, such that each bit from a respective memory device is transferred over the same respective data path achieving chipkill for both the memory devices and its respective data path to the error corrector 46.

In the example of FIG. 3, the even bits of adjacent bit pair domain 0 are transmitted across the mid-bus 42 to the domain data aggregator 44 in a transfer cycle 0. The odd bits of adjacent bit pair domain 0 are then transmitted across the mid-bus 42 to the domain aggregator 44 in a transfer cycle 1. The even bits correspond to even column width locations (e.g., column 0, column 2, column 4, column 6, etc.) in the memory devices. The odd bits correspond to odd column width locations (e.g., column 1, column 3, column 5, column 7, etc.) in the memory devices. Each even bit and odd bit of an adjacent bit pair associated with a memory device is transmitted across the same data path. The domain data aggregator 46 then aggregates or combines the odd and even bits of each adjacent pair to reconstruct the adjacent bit pair domain 0. The adjacent bit pair domain 0 is then provided to the error corrector 46 for error detection and correction of single bit errors and adjacent double bit errors.

The even bits of adjacent bit pair domain 1 are then transmitted across the mid-bus 42 to the domain data aggregator 44 in a transfer cycle 2. The odd bits of adjacent bit pair domain 1 are then transmitted across the mid-bus 42 to the domain data aggregator 44 in a transfer cycle 3. The domain data aggregator 44 aggregates or combines the odd and even bits of each adjacent pair to reconstruct the adjacent bit pair domain 1. The adjacent bit pair domain 1 is provided to the error corrector 46 for error detection and correction of single bit errors and adjacent double bit errors. This is repeated for each domain until the final domain M-1. In the final domain M-1, the even bits of adjacent bit pair domain M-1 are transmitted across the mid-bus 42 to the domain data aggregator 44 in a transfer cycle 2M-2, while the odd bits of adjacent bit pair domain M-1 are then transmitted across the mid-bus 44 to the domain data aggregator 44 in a transfer cycle 2M-1. It is to be appreciated that odd bits of adjacent bit pairs can be transmitted across the mid-bus 44 before even bits, and the order of even and odd bit transmissions can be interchanged for different adjacent bit pair domains, as long as bits from the same memory device are transmitted across the same data paths.

Figure 4:
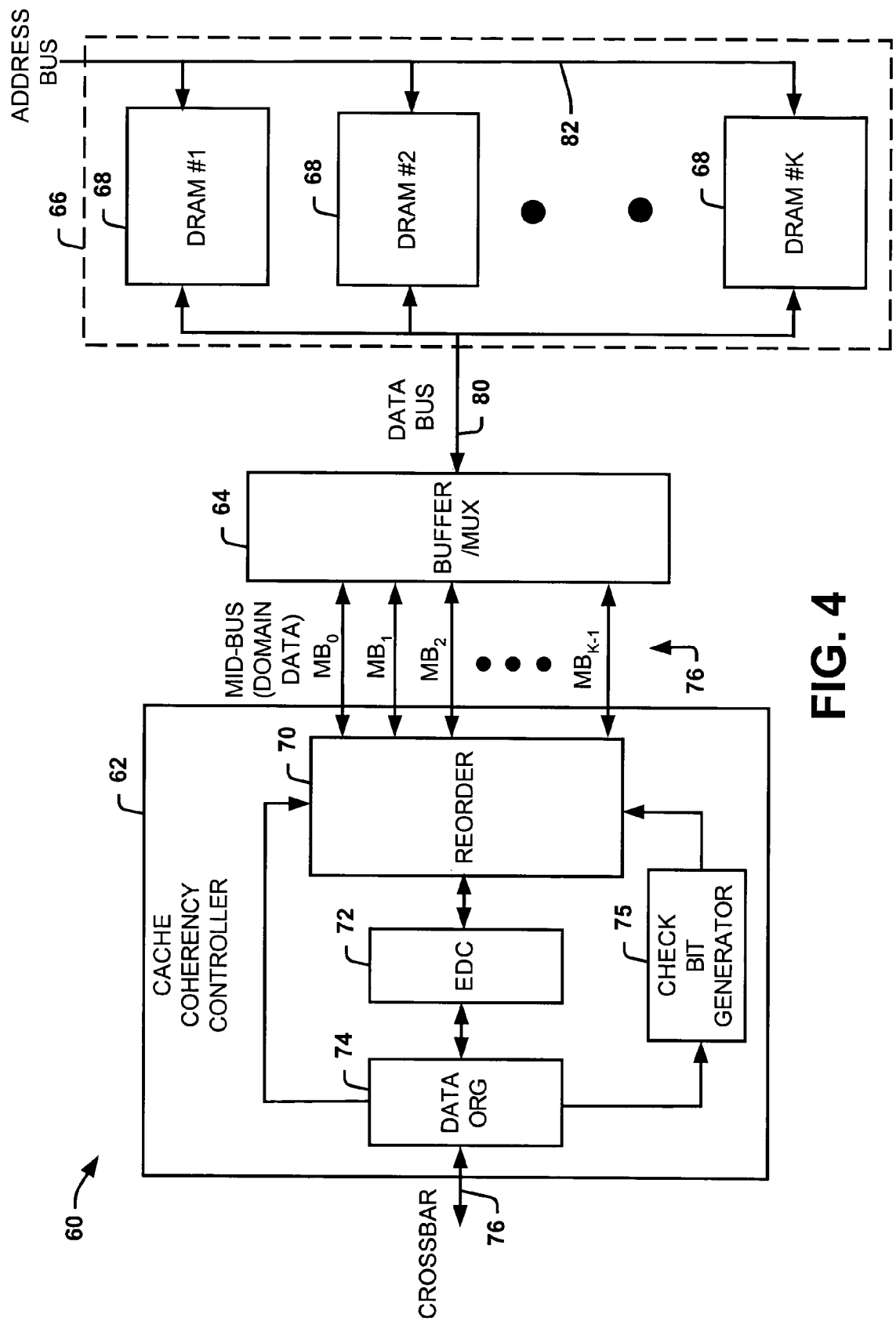
FIG. 4 illustrates a block diagram of one particular implementation of a system for detecting and correcting bit errors associated with a data structure transmitted over a data path in accordance with an embodiment of the present invention.

FIG. 4 illustrates one particular implementation of a system 60 for detecting and correcting errors in a data structure transmitted over a data path in accordance with an aspect of the present invention. The system 60 includes a cache coherency controller 62, a buffer/multiplexer 64 and a system memory 66. The cache coherency controller 60 includes functionality associated with performing error detection and correction for single bit errors and adjacent double bit errors associated with a data structure stored in the system memory 66. The cache coherency controller 62 also includes functionality associated with check bit generation to provide check bits employed during error detection and correction. It is also to be appreciated that the cache coherency controller 62 can include other functionality associated with controlling access to a crossbar device (not shown) over a crossbar bus 76.

The system memory 66 is comprised of a plurality of DRAM devices 68, labeled memory device #1 through #K, where #K is an integer greater than one. For illustrative purposes, the DRAM devices 68 of FIG. 3 will be discussed as being 4-bit column width devices. However, other column width devices (e.g., 8, 16, 32, 64, etc.) can be employed in accordance with the present invention. The system memory 66 is coupled to a data bus 80 and an address bus 82. The size of the data bus 80 and data structure read and written to the system memory during a DRAM cycle is equal to the number of memory devices 68 multiplied by the bit column width of the memory devices 68. In the present example, the system memory 66 is comprised of 72 DRAM devices with 4 bit-width columns. Therefore, the size or width of the data bus 80 and data structure stored and read in a single memory cycle is 288 bits.

The cache coherency controller 62 includes an error detection and correction (EDC) component 72 that performs error correction and detection on 144 bits including 12 check bits (e.g., 132 data bits, 12 check bits). The EDC component 72 is operative to detect and correct both single bit errors and adjacent double bit errors. The functionality of the EDC component 72 can be comprised of hardware, software or a combination of hardware and software. The cache coherency controller 62 and the EDC component 72 can be formed from an application specific integrated circuit or very large scale integrated circuit (VLSI). Although the EDC component 72 is illustrated as residing in a cache coherency controller 62, it is to be appreciated that the EDC component 72 can reside in any memory controller or in a stand-alone component.

The cache coherency controller 62 is coupled to a crossbar device (not shown) via the crossbar bus 76. The cache coherency controller 62 is also coupled to a mid-bus 78. The crossbar device can be coupled to a plurality of microprocessor devices, input/output devices and/or memory devices (e.g., one or more cache memory devices), and allows for communications and routing between the various devices of the system 60. The mid-bus 78 connects the cache coherency controller 62 to the buffer/multiplexer device 64. The mid-bus includes a plurality of data paths labeled, $MB_0$–$MB_{K-1}$.

Each data path is associated with a respective memory device 68, such that bits read from a given memory device 68 are transmitted over the same data path of the mid-bus 76. The buffer/multiplexer device 64 is coupled to the system memory 66 via the data bus 80.

During a read operation, a data structure associated with an address is read from the plurality of DRAM devices 68 and provided to the buffer/multiplexer 64 via the data bus 80. The buffer/multiplexer 64 separates or partitions the 288 bit data structure into a first adjacent bit pair domain of 144 bits and a second adjacent bit pair domain of 144 bits. The first adjacent bit pair domain includes adjacent bit pairs from the first and second columns of the DRAM devices 68 associated with a given row address, and the second adjacent bit pair domain includes adjacent bit pairs from the third and fourth columns of the DRAM devices 68 associated with the given row address.

The data bits associated with the first adjacent bit pair domain are further partitioned into an even 72-bit portion and an odd 72 bit portion by the buffer/multiplexer 64. The even 72-bit portion is transmitted over the mid-bus 76 to the reorder component 70 in a first transfer cycle. Each even bit is transmitted over its respective data path associated with its respective memory device 68. For example, the bit from column zero of the DRAM #1 is transmitted over data path $MB_0$, the bit from column zero of DRAM #2 is transmitted over data path $MB_1$, etc., while the bit from column zero of DRAM #K is transmitted over data path $MB_{K-1}$. The odd 72-bit portion is then transmitted over the mid-bus to the reorder component in a second transfer cycle. Each odd bit is transmitted over its respective data path associated with its respective memory device 68. For example, the bit from column one of the DRAM #1 is transmitted over data path $MB_0$, the bit from column one of DRAM #2 is transmitted over data path $MB_1$, etc., while the bit from column one of DRAM #K is transmitted over data path $MB_{K-1}$.

The reorder component 70 then reorders the even and odd 72-bit portions into the original 144 bits associated with the first adjacent bit pair domain. The 144 bits associated with the first adjacent bit pair domain is then provided to the EDC component 72. The EDC component 72 performs an error detection and correction technique on the first adjacent bit pair domain for detecting and correction both single bit errors and adjacent double bit errors. The corrected data associated with the first adjacent bit pair domain is then provided to a data organizer 74.

The buffer/multiplexer 64 partitions the 144 bits associated with the second adjacent bit pair domain into an even 72-bit portion and an odd 72-bit portion. The even 72-bit portion is transmitted over the mid-bus 76 to the reorder component 70 in a third transfer cycle. Each even bit is transmitted over its respective data path associated with its respective memory device. For example, the bit from column two of the DRAM #1 is transmitted over data path $MB_0$, the bit from column two of DRAM #2 is transmitted over data path $MB_1$, etc., while the bit from column two of DRAM #K is transmitted over data path $MB_{K-1}$. The odd 72-bit portion is then transmitted over the mid-bus 76 to the reorder component 70 in a fourth transfer cycle. Each odd bit is transmitted over its respective data path associated with its respective memory device 68. For example, the bit from column three of the DRAM #1 is transmitted over data path $MB_0$, the bit from column three of DRAM #2 is transmitted over data path $MB_1$, etc., while the bit from column three of DRAM #K is transmitted over data path $MB_{K-1}$.

The reorder component 70 then reorders the even and odd 72-bit portions into the original 144 bits associated with the second adjacent bit pair domain. The 144 bits associated with the second adjacent bit pair domain is then provided to the EDC component 72. The EDC component 72 performs an error detection and correction technique on the second adjacent bit pair domain for detecting and correction both single bit errors and adjacent double bit errors. The corrected data associated with the second adjacent bit pair domain is then provided to a data organizer 74. In one aspect of the invention, the data bus 80 operates at 125 MHZ for reading and writing 288 bit data structures and the mid-bus 78 operates at 500 MHZ for transferring 72 bit domain data portions.

The EDC component 72 separates the 132 data bits and the 12 check bits from the 144 bits associated with the respective adjacent bit pair domain. A syndrome is computed using the 132 data bits to produce a 144 bit error mask. The error mask is exclusive-OR'ed with the original 144 bit of data and check bits. The single bit errors and adjacent double bit errors are corrected. The 12 check bits are discarded and the remaining 132 bits are provided to a data organizer 74. The data organizer 74 reorganizes the 132 bits into 128 bit data blocks. The 128 bit data blocks from each adjacent bit pair domain are aggregated and transmitted to the crossbar device to a requestor (e.g., a processor, I/O device).

During a write operation, a data block to be written to system memory 66 is received by the data organizer 74. The data organizer 74 assigns or separates adjacent data bit pairs to separate adjacent bit pair domains based on the column widths of the DRAM devices 68. The data bits are then provided to the reorder component 70 and a check bit generator 75. The check bit generator generates 12 check bits or correction bits associated with each adjacent bit pair domain. The check bits are then provided to the reorder component 70 to populate the adjacent bit pair domain with its associated check bits. Once all of the adjacent bit pair domains have been populated with data bits and check bits, the adjacent bit pair domains are transmitted over the mid-bus 78 to the buffer/multiplexer 64, similar to that described for a write operation with the data bits associated with respective memory devices being transmitted over the same data path. The buffer/multiplexer 64 combines the data associated with the adjacent bit pair domains to form a data structure, which is then stored in the system memory 66 based on a selected address of the address bus 82.

FIG. 5 illustrates one particular implementation of an adjacent bit pair domain configuration 100 in accordance with an aspect of the present invention. The adjacent bit pair domain configuration 100 provides chipkill functionality for both system memory and data paths from the system memory to an error corrector. The error corrector employs an ECC technique (e.g., via a EDC component) that can correct single bit errors and adjacent double bit errors. The configuration 100 illustrates a data structure 102 associated with a DRAM cycle (e.g., read cycle, write cycle) having B data bits, where B is an integer multiple of 4 that is greater than or equal to 8. The data structure 102 includes a plurality of 4-bit wide nibbles 104 each being associated with a respective DRAM device.

A first adjacent bit pair of each of the 4-bit wide nibbles 104 are assigned to a first adjacent bit pair domain 106 (Domain 0) and the second adjacent bit pair of each of the 4-bit wide nibbles are assigned to a second adjacent bit pair domain 108 (Domain 1). The first adjacent bit pair domain 106 includes bits 0 through S-1, while the second adjacent bit pair domain 108 includes bits 0 through R-1, where R=S=B/2. The bits associated with the first adjacent bit pair domain 106 can be processed by an EDC component sequentially or in parallel with the bits associated with the second adjacent bit pair domain 108, such that chipkill for the memory system is achieved.

FIG. 6 illustrates one particular implementation of an adjacent bit pair domain transfer sequence in accordance with an aspect of the present invention. A first adjacent bit pair domain (Domain 0) and a second adjacent bit pair domain (Domain 1) reside in a data separator/router 128. The transfer sequence includes a first two-cycle transfer for the first adjacent bit pair domain and a second two-cycle transfer for the second adjacent bit pair domain. In the first two-cycle transfer, a first bit of each adjacent bit pair from the first domain are transferred over a mid-bus 122 via a respective data path during a first transfer cycle to a domain data aggregator 124. A second bit of each adjacent bit pair from the first domain is then transferred over the mid-bus 122 via the same respective data path of the adjacent bit pair first bit during a second transfer cycle to the domain data aggregator 124. The domain data aggregator 124 then aggregates or combines the first and second bits of each adjacent pair to reconstruct the first adjacent bit pair domain. The first adjacent bit pair domain is then provided to an error corrector 126 for error detection and correction of single bit errors and adjacent double bit errors.

While error correction is performed on the first adjacent bit pair domain, data associated with the second adjacent bit pair domain is transferred over the mid-bus 122. In the second two-cycle transfer, a first bit of each adjacent bit pair from the second domain are transferred over the mid-bus 122 via a respective data path during a third transfer cycle to the domain data aggregator 124. A second bit of each adjacent bit pair from the second domain is then transferred over the mid-bus 122 via the same respective data path of the adjacent bit pair first bit during a fourth transfer cycle to the domain data aggregator 124. The domain data aggregator 124 then aggregates or combines the first and second bits of each adjacent bit pair to reconstruct the second adjacent bit pair domain. The second adjacent bit pair domain is then provided to an error corrector 126 for error detection and correction single bit errors and adjacent double bit errors.

It is to be appreciated that during the four transfer cycles, the 4 bits associated with a given memory device are transmitted across the same respective data path of the mid-bus 124. This is conjunction with partitioning the data into separate adjacent bit pair domains facilitates chipkill functionality for both memory devices and data paths associated with a data structure read and stored in system memory.

Figure 7:
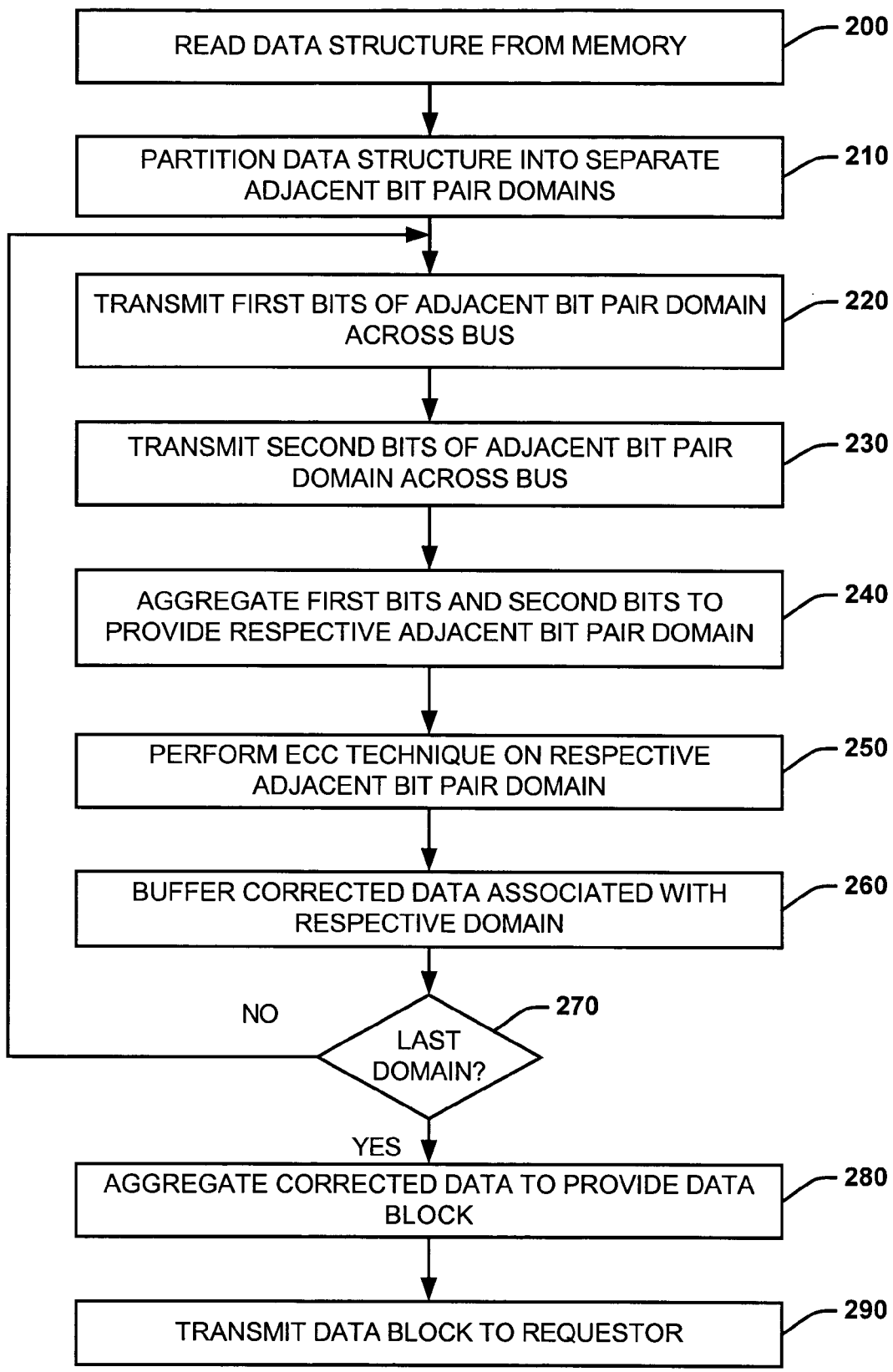
FIG. 7 is a flow diagram illustrating a methodology for reading a data structure in accordance with an embodiment of the present invention.

In view of the foregoing structural and functional features described above, a methodology in accordance with an aspect of the present invention will be better appreciated with reference to FIG. 7. While, for purposes of simplicity of explanation, the methodology of FIG. 7 is shown and described as being implemented serially, it is to be understood and appreciated that the present invention is not limited to the illustrated order, as some aspects could, in accordance with the present invention, occur in different orders and/or concurrently with other aspects from that shown and described. Moreover, not all illustrated features may be required to implement a methodology in accordance with an aspect of the present invention. It is to be further understood that the following methodology can be implemented in hardware, software (e.g., computer executable instructions), or any combination thereof.

FIG. 7 illustrates a methodology for reading data in accordance with an aspect of the present invention. The methodology begins at 200 where a data structure is read from the system memory. At 210, the data structure is partitioned into separate adjacent bit pair domains, such that a single adjacent bit pair domain contains one adjacent bit pair from each memory device. The number of adjacent bit pair domains depends on the column widths of the memory devices forming the system memory.

At 220, a first bit of each respective adjacent bit pair associated with a respective domain is transmitted across a bus from the data partitioning device. Each of the first bits is transmitted across a respective data path of the bus corresponding to the memory device in which the bit was stored. At 230, a second bit of each respective adjacent bit pair associated with the respective adjacent bit pair domain is transmitted across the bus from the data partitioning device. Each of the second bits is transmitted across a respective data path of the bus corresponding to the memory device in which the bit was stored. In one aspect of the invention, the first bits correspond to even columns in memory, while the second bits correspond to odd columns in memory. Alternatively, the first bits can correspond to odd columns in memory, while the second bits can correspond to even columns in memory.

At 240, the first bits and the second bits are aggregated to reconstruct the respective adjacent bit pair domain. At 250, an ECC technique is performed on the respective adjacent bit pair domain to correct single bit errors and adjacent double bit errors associated with the bits in the respective adjacent bit pair domain. The ECC technique determines the existence of errors in the respective adjacent bit pair domain by separating data bits from the check bits, performing an ECC routine on the data structure portion to generate a syndrome to produce a mask, and performing an exclusive-OR on the data structure portion and the mask to detect single bit errors and adjacent double bit errors. The ECC technique then corrects the single bit errors and adjacent double bit errors. The ECC technique, the separating of the data structure into adjacent bit pair domains and the transmitting of data bits associated with a given memory device over the same data path facilitates chipkill for both the memory devices and the data transmission paths associated with bits that form the data structure.

The corrected data associated with the respective domain is then buffered at 260. The methodology then proceeds to 270 to determine if the respective adjacent pair domain was the last domain. If the respective adjacent pair domain was not the last domain (NO), the methodology returns to 220 to repeat the transmitting of data bits for a subsequent adjacent bit pair domain. If the respective adjacent pair domain was the last domain (YES), the methodology proceeds to 280. At 280, the corrected data from each adjacent bit pair domain is aggregated to provide a data block. At 290, the data block is transmitted to a requestor (e.g., a processor through a crossbar device).

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system of routing data structure content to facilitate error correction, the system comprising:
a data structure partitioned into a plurality of adjacent bit pair domains, such that a single adjacent bit pair from each of a plurality of memory devices is assigned to an adjacent bit pair domain for each of the plurality of adjacent bit pair domains; and
a data router that transmits adjacent bit pair domain data over a bus having a plurality of data paths, the data router transmits a first set of bits associated with a respective adjacent bit pair domain during a first transfer cycle, and transmits a second set of bits associated with the respective adjacent bit pair domain during a second transfer cycle, such that bits associated with a given adjacent bit pair are transmitted over a same data path for the plurality of data paths.

2. The system of claim 1, the first set of bits being associated with one of an even column and odd column of the plurality of memory devices, and the second set of bits being associated with the other of the even column and odd column of the plurality of memory devices.

3. The system of claim 1, the data router repeats the transmission of a first set of bits during a first transfer cycle and a second set of bits during a second transfer cycle for each of the plurality of adjacent bit pair domains, such that bits associated with a given memory device are transmitted over a same data path over a plurality of first and second transfer cycles.

4. The system of claim 1, further comprising:
a domain data aggregator that aggregates the first set of bits and the second set of bits to reconstruct the respective adjacent bit pair domain; and
an error detection and correction (EDC) component that detects and corrects errors associated with the reconstructed adjacent bit pair domain.

5. The system of claim 4, the EDC component detects and corrects errors associated with the plurality of adjacent bit pair domains in a one of a sequential manner and a parallel manner.

6. The system of claim 1, the data router being a buffer/multiplexer device.

7. The system of claim 1, the data structure comprising B bits and each of the plurality of adjacent bit pair domains having B/2 bits, where B is an integer multiple of four that is greater than or equal to eight.

8. The system of claim 7, the data structure comprising 288 bits and each of the plurality of adjacent bit pair domains having 144 bits.

9. The system of claim 1, the data structure having K*W bits, where K is the number of the plurality of memory devices forming a system memory, and W is the column widths of the plurality of memory devices.

10. The system of claim 1, further comprising a check bit generator that generates check bits that are aggregated with data bits to form an adjacent bit pair domain for each of the plurality of adjacent bit pair domains.

11. A server comprising the system of claim 1.

12. The system of claim 1 being configured to facilitate chipkill functionality for the plurality of memory devices and the plurality of data paths.

13. A memory system comprising:
a plurality of memory devices operative store a data structure corresponding to a given memory address;
a buffer/multiplexer device that transmits and receives the data structures over a first bus and transmits and receives adjacent bit pair domain data over a second bus, the second bus having a plurality of data paths associated therewith, the adjacent bit pair domain data comprising a single adjacent bit pair from each of a plurality of memory devices assigned to an adjacent bit pair domain for a plurality of adjacent bit pair domains, the adjacent bit pair domain data being transmitted over the second bus, such that adjacent bit pairs associated with a given memory device are transmitted over a same data path; and a controller operative to transmit and receive adjacent bit pair domain data over the second bus and operative to transmit and receive data blocks corresponding to the adjacent bit pair domain data over a third bus.

14. The system of claim 13, the buffer/multiplexer device transmits a first set of bits associated with a respective adjacent bit pair domain over the second bus during a first transfer cycle, and a second set of bits associated with the respective adjacent bit pair domain over the second bus during a second transfer cycle, such that bits associated with a single adjacent bit pair are transmitted over a same data path in a two cycle transfer.

15. The system of claim 14, the buffer/multiplexer device repeats the transmission of a first set of bits during a first transfer cycle and a second set of bits during a second transfer cycle for each of the plurality of adjacent bit pair domains, such that bits associated with a given memory device are transmitted over a same data path over a plurality of two cycle transfers.

16. The system of claim 14, the controller further comprising:

a domain data aggregator that aggregates the first set of bits and the second set of bits to reconstruct the adjacent bit pair domain; and an error detection and correction (EDC) component operative to detect and correct single bit errors and adjacent double bit errors associated with a respective adjacent bit pair domain.

17. The system of claim 13, the controller being one of a memory controller and a cache coherency controller.

18. The system of claim 13, the controller further comprising a check bit generator that generates check bits associated with respective adjacent bit pair domains, the check bits being employed by an EDC component to correct single bit errors and adjacent double bit errors.

19. A system for routing a data structure to facilitate error correction, the system comprising:

means for partitioning a data structure into a plurality of adjacent bit pair domains, each adjacent bit pair domain being populated with a single adjacent bit pair from each of a plurality of memory devices associated with a given memory address;

means for detecting and correcting single bit errors and adjacent double bit errors associated with a respective adjacent bit pair domain; and means for routing the adjacent bit pair domain data over a bus having a plurality of data paths to the means for detecting and correcting, the means for routing transmitting single adjacent bit pairs associated with respective memory devices over respective same data paths of the plurality of data paths.

20. The system of claim 19, the means for routing transmitting a first set of bits during a first cycle and a second set of bits during a second cycle for a respective adjacent bit pair domain, such that bits associated with a given adjacent bit pair and a given memory device are transmitted over a same data path over a two cycle transfer for each of the plurality of adjacent bit pair domains.

21. The system of claim 19, the means for detecting and correcting comprising a plurality of means for detecting and correcting single bit errors and adjacent double bit errors associated with different respective adjacent bit pair domains.

22. A method of routing data structure content to facilitate the detection and correction of errors, the method comprising:

reading a data structure from a plurality of memory devices associated with a given memory address;

separating the data structure into a plurality of adjacent bit pair domains, each adjacent bit pair domain being populated with a single adjacent bit pair from each of a plurality of memory devices associated with a given memory address;

transmitting adjacent bit pair domain data associated with the plurality of adjacent bit pair domains over a bus having a plurality of data paths, the adjacent bit pair domain data associated with a respective adjacent bit pair domain being transmitted over the bus in a two-cycle transfer, such that bits associated with a given memory device are transmitted over a same data path;

aggregating the adjacent bit pair domain data associated with the two-cycle transfer to reconstruct the respective adjacent bit pair domain; and performing error detection and correction on the reconstructed respective adjacent bit pair domain.

23. The method of claim 22, further comprising repeating the two-cycle transfer for each of the plurality of adjacent bit pair domains, such that bits associated with a given memory device from each of the plurality of adjacent bit pair domains are transmitted over a same data path.

24. The method of claim 22, the performing error detection and correction comprising performing error detection and correction to correct for single bit errors and adjacent double bit errors in the reconstructed respective adjacent bit pair domain.

25. The method of claim 22, the adjacent bit pair domain data being transmitted over the bus in a two-cycle transfer, such that bits associated with a given memory device are transmitted over a same data path to facilitate chipkill functionality for the plurality of memory devices and the plurality of data paths.

* * * * *

UNITED STATES PATENT AND TRADEMARK OFFICE
CERTIFICATE OF CORRECTION

PATENT NO. : 7,051,265 B2 Page 1 of 1
APPLICATION NO. : 10/632206
DATED : May 23, 2006
INVENTOR(S) : Jay Tsao et al.

It is certified that error appears in the above-identified patent and that said Letters Patent is hereby corrected as shown below:

In column 1, line 57, delete "with" and insert -- within --, therefor.

In column 12, line 63, in Claim 13, after "operative" insert -- to --.

Signed and Sealed this

Seventeenth Day of March, 2009

JOHN DOLL
*Acting Director of the United States Patent and Trademark Office*